(12) United States Patent
Lipka et al.

(10) Patent No.: US 9,269,983 B2
(45) Date of Patent: Feb. 23, 2016

(54) FLOW BATTERY

(75) Inventors: Stephen M. Lipka, Richmond, KY (US); Christopher R. Swartz, Lexington, KY (US)

(73) Assignee: The University of Kentucky Research Foundation, Lexington, KY (US)

( * ) Notice: Subject to any disclaimer, the term of this patent is extended or adjusted under 35 U.S.C. 154(b) by 61 days.

(21) Appl. No.: 14/118,651

(22) PCT Filed: May 23, 2012

(86) PCT No.: PCT/US2012/039122
§ 371 (c)(1),
(2), (4) Date: Nov. 19, 2013

(87) PCT Pub. No.: WO2012/162383
PCT Pub. Date: Nov. 29, 2012

(65) Prior Publication Data
US 2014/0295311 A1    Oct. 2, 2014

Related U.S. Application Data

(60) Provisional application No. 61/489,072, filed on May 23, 2011.

(51) Int. Cl.
*H01M 8/18* (2006.01)
*H01M 8/20* (2006.01)

(52) U.S. Cl.
CPC ............. *H01M 8/188* (2013.01); *H01M 8/20* (2013.01); *H01M 2300/0011* (2013.01); *Y02E 60/528* (2013.01)

(58) Field of Classification Search
None
See application file for complete search history.

(56) References Cited

U.S. PATENT DOCUMENTS

| 5,310,608 | A | 5/1994 | Ishizawa et al. |
| 6,986,966 | B2 | 1/2006 | Clarke et al. |
| 7,258,947 | B2 | 8/2007 | Kubata et al. |
| 7,537,859 | B2 | 5/2009 | Samuel et al. |
| 7,820,321 | B2 | 10/2010 | Horne et al. |
| 2009/0047571 | A1* | 2/2009 | Harper ............................ 429/72 |
| 2012/0045680 | A1 | 2/2012 | Dong et al. |
| 2012/0052347 | A1* | 3/2012 | Wilson et al. ................... 429/72 |
| 2012/0077068 | A1 | 3/2012 | Wang et al. |
| 2012/0077079 | A1 | 3/2012 | Li et al. |
| 2012/0107661 | A1 | 5/2012 | Lee et al. |

FOREIGN PATENT DOCUMENTS

| BE | 1001404 A6 | 10/1989 |
| FR | 1078903 A | 11/1954 |
| FR | 1533662 A | 7/1968 |
| GB | 1354886 A | 6/1974 |

OTHER PUBLICATIONS

International Search Report and Written Opinion for International application No. PCT/US2012/039122 dated Aug. 28, 2012.

\* cited by examiner

*Primary Examiner* — Patrick Ryan
*Assistant Examiner* — Wyatt McConnell
(74) *Attorney, Agent, or Firm* — King & Schickli, PLLC

(57) ABSTRACT

An electrolyte system for a flow battery has an anolyte including $[Fe(CN)_6]^{3-}$ and $[Fe(CN)_6]^{4-}$ and a catholyte including $Fe^{2+}$ and $Fe^{3+}$.

22 Claims, 9 Drawing Sheets

FLOW BATTERY

This application is the national stage of international patent application no. PCT/US2012/039122 filed on May 23, 2012, which in turn claims priority from U.S. Provisional Patent Application Ser. No. 61/489,072 filed on 23 May 2011, the full disclosures of which are incorporated herein by reference.

GOVERNMENT LICENSE RIGHTS

This invention was made with government support under Phase I Small Business Innovation Grant awarded by the Department of Energy under contract no. DE-FG02-09ER85267. The government has certain rights in the invention.

BACKGROUND

The present invention relates to flow batteries and particularly to redox flow batteries. Flow batteries are electrochemical devices in which the chemical energy stored in electroactive materials is converted to electrical energy. The electroactive materials include those for the negative electrode reaction and those for the positive electrode reaction. In flow batteries, the electro-active materials are typically stored externally to the power-conversion device and are introduced into the power-conversion device when the device is operated.

Unlike traditional batteries, where active materials, electrolyte, and separator are stored within the casing of the electrochemical cell, redox flow batteries feature electrolytes which are stored in external tanks, and are pumped into the cell during each charge/discharge cycle. One feature of redox flow batteries is that the energy is stored in the soluble oxidized/reduced species which exist in the electrolyte, unlike traditional batteries, where energy is stored in the bulk electrode materials, and which are thus subjected to mechanical and thermal stresses during cycling, thereby contributing to reduced battery cycle life.

Some advantages of redox flow batteries may include: rapid response times, moderate cost, modularity, transportability, low maintenance, and flexible operation. Redox flow batteries may also be capable of extended cycle life, as systems with greater than 10,000 charge/discharge cycles have been reported.

SUMMARY

In accordance with the purposes and advantages disclosed herein, an electrolyte system is provided for a flow battery. The electrolyte system may be broadly described as comprising an anolyte including $[Fe(CN)_6]^{3-}$ and $[Fe(CN)_6]^{4-}$ and a catholyte including $Fe^{2+}$ and $Fe^{3+}$. The anolyte may also include a first supporting electrolyte. The first supporting electrolyte is selected from a group of ions consisting of $Cl^-$, $OH^-$, $CO_3^{2-}$ and mixtures thereof. In this system the $Fe^{2+}$ may have a concentration of at least about 0.4M, 0.5M, 0.6M or 0.7M. The anolyte may also have a sodium hydroxide concentration between about 1.0M to 3.0M.

The catholyte may include an iron/ligand complex. The ligand of the iron/ligand complex may be selected from a group consisting of triethanolamine, diethanolamine, ethanolamine, N,N-bis-(2-hydroxyethyl)-(iminotris)-(hydroxymethyl)-methane and mixtures thereof. Further the catholyte may have a ligand-to-iron ratio of about 3:1 to about 10:1. In addition the catholyte has an $Fe^{3+}$ concentration of at least about 0.5M, 0.6M or 0.7M. Further the catholyte may include a second supporting electrolyte wherein that electrolyte is selected from a group of ions consisting of $Cl^-$, $OH^-$ and mixtures thereof.

A redox flow battery using the anolyte and catholyte is also provided. That battery may contain a plurality of cells.

BRIEF DESCRIPTION OF THE DRAWING FIGURES

The accompanying drawing figures incorporated in and forming a part of the specification, illustrate several aspects of the present electrolyte system and redox flow battery and together with the description serve to explain certain principles thereof. In the drawing figures.

Figure 1:
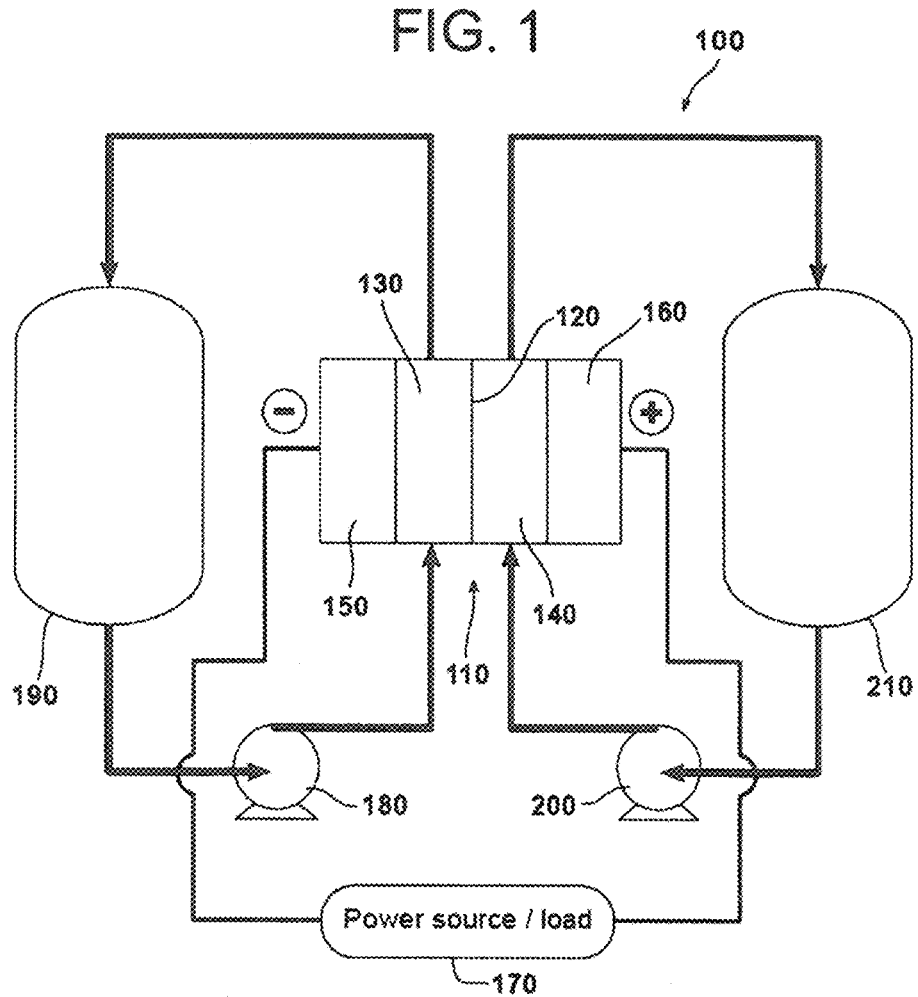
FIG. 1 shows a schematic of a single redox flow cell.

Reference will now be made in detail to the present embodiments, examples of which are illustrated in the accompanying drawing figures.

DETAILED DESCRIPTION

Embodiments disclosed herein provide redox flow battery devices and related methods wherein both the anolyte and the catholyte include an iron redox couple. Embodiments of individual redox flow cells and redox flow cells connected in series using bipolar plates are disclosed. The redox flow cells can include electrodes including carbon nanospheres prepared from renewable sources. Also provided are electrical energy storage systems comprising redox flow battery devices.

The theoretical capacity of a redox flow battery can be expressed as the total quantity of electricity produced during the electrochemical reaction; this value is defined in terms of coulombs or ampere-hours. In the case of the Vanadium Redox Battery ("VRB"), this is defined by the number of vanadium ions dissolved in the electrolyte; thus the available charge ("Qc") depends on the total vanadium concentration ($C"_{Vtotal}$") and on the size of the electrolyte storage tank ("$V_{tank}$") according to the following relation:

$$Q_C = C_{Vtotal} V_{tank} N_A e \text{[coulombs]}$$

where, $N_A$ is the Avogadro constant and e is the electron charge, $1.6 \times 10^{-19}$ coulombs. The energy stored in the electrolyte ("$E_{electr}$") is then determined by the product of the available charge ("$Q_{C"}$") and the cell voltage ("$V_{cell}$"). As $V_{cell}$ depends on the operating conditions (e.g., discharge rate, electrolyte concentration, cell resistance, etc.), an average cell voltage ("$V_{cellavg}$") is used. For a VRB, this is given as 1.35 V.

To operate any flow battery, the two redox reactions for both the catholyte and anolyte must occur concurrently in both half-cells. As a result, the energy stored in the battery is divided between the two electrolytes. The electrolyte energy, $E_{electr}$ becomes:

$$E_{electr} = \tfrac{1}{2} V_{cellavg} Q_C / 3600 [Wh]$$

For a redox flow battery where the energy is stored in the form of liquid electrolyte, the energy density is the ratio of the amount of stored energy to the volume or mass of the redox solutions. Therefore, the electrolyte energy density per unit volume can be given as:

$$U_{electr} = E_{electr} / V_{tank} [Wh/L]$$

Assuming a 1M concentration for the VRB, and an average cell voltage of 1.35V, the calculated electrolyte volumetric energy density $U_{electr}$ is 18 Wh/L.

In one embodiment of an Fe/Fe redox flow battery, the salt used in the catholyte, $Fe^{3+}$ (TEOA), is the limiting electrolyte since it has the lowest molar solubility at 0.7M in 3M NaOH. Taking the average discharge voltage of the all iron redox flow battery as 1.2V, the calculated energy density $U_{electr}$ is 11.3 Wh/L. Improvement in the energy density of the all—Fe redox battery can be made if either the molarity of the catholyte can be increased beyond 0.7M or the discharge voltage of the cell can be increased.

Redox Flow Batteries

In one aspect, a redox flow battery based on iron redox couples at both positive and negative electrodes is provided. The redox flow battery can include an anolyte and a catholyte, where the anolyte includes a first iron redox couple and the catholyte includes a second iron redox couple.

In some embodiments, the first iron redox couple can include a ferrocyanide/ferricyanide redox couple. In some embodiments, the ferrocyanide/ferricyanide redox couple can be prepared from a hexacyanoferrate salt such as, for example, $K_4Fe(CN)_6 \cdot 3H_2O$, $K_3Fe(CN)_6$, ferrous sulfate ("$FeSO_4$"), and ferric sulfate ("$Fe_2(SO_4)_3$").

The anolyte may be prepared by dissolving the hexacyanoferrate salt in deionized water. In some embodiments, the anolyte may include a supporting electrolyte, such as, for example, NaCl, NaOH, KCl, KOH, $Na_2CO_3$, $K_2CO_3$, and combinations thereof.

In some embodiments, the anolyte may have an $Fe^{2+}$ concentration of at least about 0.4M, at least about 0.5M, at least about 0.6M, or at least about 0.7M. In some embodiments, the anolyte may have a pH greater than about 7. In some embodiments, the anolyte may have a sodium hydroxide concentration of about 1M to about 3M.

In some embodiments, the second iron redox couple can include an iron/ligand complex. In some embodiments, the ligand can include, for example, triethanolamine ("TEOA"), diethanolamine, ethanolamine, N,N-bis-(2-hydroxyethyl)-3-amino-2-hydroxypropanesulfonic acid, 2,2-bis-(hydroxyethyl)-(iminotris)-(hydroxymethyl)-methane, and combinations thereof. In some embodiments, the second iron redox couple can include an iron/TEOA complex.

The catholyte may be prepared by dissolving an iron salt such as, for example, iron (III) sulfate in water and adding the resulting iron solution to a ligand dissolved in a supporting electrolyte. In some embodiments, the ratio of ligand to iron ion in the catholyte may be at about 3:1 to about 10:1.

In some embodiments, the catholyte may include an $Fe^{3+}$ concentration of at least about 0.5M, at least about 0.6M, or at least about 0.7M. In some embodiments, the supporting electrolyte may include, for example, sodium chloride, potassium chloride, sodium hydroxide, potassium hydroxide, and combinations thereof. In some embodiments, the pH of the catholyte may be greater than about 7. In some embodiments, the pH of the catholyte may be between 5 and 7. In some embodiments, the anolyte may have a sodium hydroxide concentration of about 1M to about 3M. In some embodiments, the anolyte may have a sodium chloride concentration of greater than about 0.4M. In some embodiments, the anolyte may not include sodium chloride.

Figure 3:
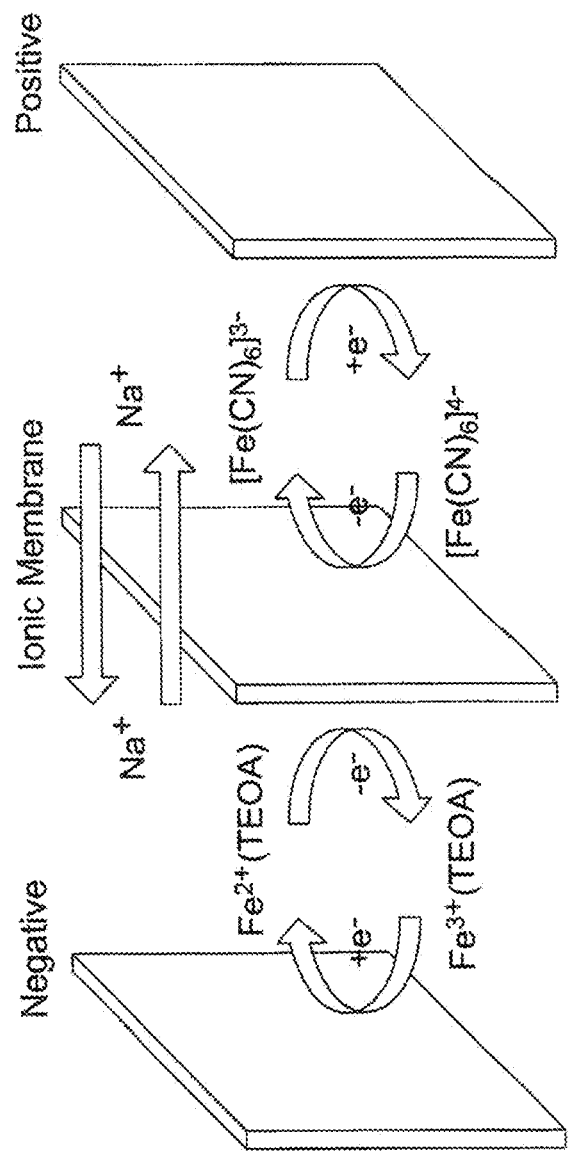
FIG. 3 shows a schematic representation of an Fe/Fe redox flow battery.

FIG. 3 illustrates a redox flow battery system based on aqueous iron/iron electrochemistry. The iron anolyte and catholyte are both based upon the $Fe^{2+}/Fe^{3+}$ redox couple. The anolyte is a mixture of 0.4-1M potassium hexacyanoferrate (dissolved in 1M NaOH, while the catholyte consists of iron/triethanolamine ("TEOA") complex (0.4-1M $Fe^{3+}$) dissolved in 0.4M NaCl/3M NaOH. Additional supporting catholyte formulations may consist of the iron/triethanolamine complex without the presence of NaCl. The Fe/Fe flow battery system uses a proton exchange membrane (i.e. Nafion®) as a separator, in order to isolate the catholyte and anolyte compartments from one another; the Nafion Membrane® is converted to the Na+ form before cell assembly. The cell charge and discharge reactions for the anolyte and catholyte are shown below in Eq. 1-2.

Positive Electrode (Anolyte):

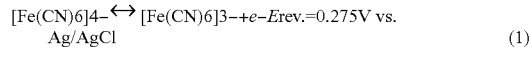

$$[Fe(CN)6]4- \leftrightarrow [Fe(CN)6]3- + e- \quad E_{rev.} = 0.275V \text{ vs. Ag/AgCl} \quad (1)$$

Negative Electrode (Catholyte):

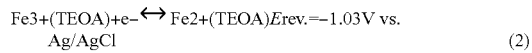

$$Fe3+(TEOA)+e- \leftrightarrow Fe2+(TEOA) \quad E_{rev.} = -1.03V \text{ vs. Ag/AgCl} \quad (2)$$

In another aspect, redox flow cells are provided. FIG. 1 illustrates an individual redox flow cell. Referring to FIG. 1, the redox flow cell 100 includes a flow cell chamber 110 divided by an ion-selective membrane 120 into a first compartment 130 and a second compartment 140. The first compartment 130 is in contact with a negative electrode 150, and the second compartment 140 is in contact with a positive electrode 160. The negative electrode 150 and the positive electrode 160 are connected to a device 170 that can function as a power source and/or a load. A first electrolyte or catholyte is pumped by a first pump 180 from a first electrolyte reservoir 190 through the first compartment 130. A second electrolyte or anolyte is pumped by a second pump 200 from a second electrolyte reservoir 210 through the second compartment.

Figure 2:
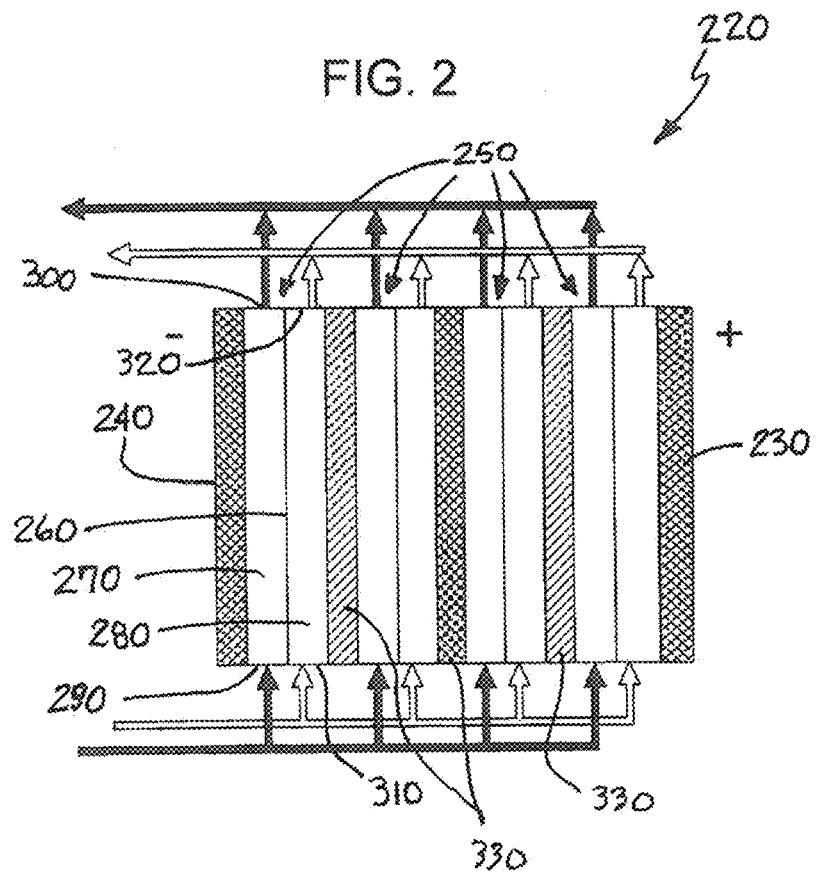
FIG. 2 shows a schematic of a bipolar stack including four individual redox flow cells.

FIG. 2 illustrates four individual redox flow cells connected in series using bipolar plates. Referring to FIG. 2, the bipolar stack 220 includes a positive end plate electrode 230 and a negative end plate electrode 240. Four flow cell chambers 250 are positioned between the end plate electrodes 230 and 240. Each flow cell chamber 250 is divided by an ion-selective membrane 260 into a first compartment 270 and a second compartment 280. Catholyte enters the first compartment 270 at a catholyte inlet 290 and exits the first compartment at a catholyte outlet 300. Anolyte enters the second compartment 280 at an anolyte inlet 310 and exits the second compartment 280 at an anolyte outlet 320. Bipolar electrodes 330 are positioned between flow cell chambers 250.

Electrodes suitable for use as the positive end plate electrode and the negative end plate electrode in redox flow batteries of the present disclosure may be, for example, inert, conductive carbon electrodes. In some embodiments, the carbon electrodes may include carbon nanoparticles prepared from renewable biopolymers using hydrothermal synthesis ("HTS") methods, such as those described in PCT Patent Application No. PCT/US12/029247, which is hereby incorporated by reference in its entirety.

In some embodiments, the electrodes may include activated carbon nanospheres prepared using HTS. In some embodiments, activated carbon nanospheres may be derived from biopolymers such as, for example, bamboo and other lignocellulosics. In some embodiments, the electrodes may include graphitized carbon nanospheres, graphitized carbon nanotubes, and combinations thereof. In some embodiments, the carbon nanospheres and/or carbon nanotubes may be air brush sprayed or pressed onto a current collector. In some embodiments, the current collector may include, for example, stainless steel or nickel mesh.

In some embodiments, the electrodes may include graphite plate and particulate. In some embodiments, the electrode may include a binder such as, for example, polytetrafluoroethylene ("PTFE") or polyvinylidenedifluoride ("PVDF"). In some embodiments, the electrode may include about 3 wt % to about 5 wt % of a binder. In some embodiments, the electrode may also include an electrically-conductive additive such as, for example, graphite particulate. In some embodiments, the electrode may include about 5 wt % to about 10 wt % of the graphite particulate.

Various carbon felts may be used in redox flow batteries as electrode materials, and include, for example, graphitic, polyacrylonitrile, and rayon-based carbon felts. In some embodiments, the carbon electrode may be coated with a transition metal such as, for example $Pt^{4+}$, $Pd^{2+}$, $Au^{4+}$, $Ir^{3+}$, and $Ru^{4+}$. (See Wang, W. H. et al. *Electrochim. Acta.* 2007, 52, 6755; Sun, B. et al. *Electrochim. Acta.* 1991, 36, 513; and Rychcik, M. et al. *J. Power Sources.* 1987, 19, 45.) In some embodiments, the carbon electrodes may include carbon nanotube or graphite/carbon nanotube composite electrodes, which may lead to higher conductivity, better electrochemical reversibility, and enhanced electron transfer kinetics.

Flow cell chambers can be made from, for example, polyvinyl chloride ("PVC"), or DELRIN™ (polyoxymethylene), or other plastic materials that are inert to the electrolyte. In some embodiments, the flow cell chambers may have a volume of about 0.05 L to about 0.5 L. In some embodiments, the anolyte and the catholyte may flow through the flow cell chambers at rates of about 10 $mLmin^{-1}$ to about 80 $mLmin^{-1}$.

Ion exchange membranes may be used in individual cells to allow the passage of ions to maintain electrical neutrality during cell operation as the redox reactions occur at the electrode/electrolyte interface. Ion exchange membranes can be, for example, NAFION® 117 ion exchange membranes (E. I. duPont de Nemours & Co., Wilmington, Del.), or SELEMION™ ion exchange membranes (Asahi Glass Co., Ltd., Tokyo, Japan).

Bipolar plates may be used in some embodiments to physically separate cells, while maintaining an electrical connection between cells. Bipolar plates are usually constructed from highly-conductive, chemically-stable, proprietary plastic carbon electrodes. Bipolar plates can also be, for example, metal plates, graphite plates, or conductive graphite-containing bipolar electrodes.

Bipolar plates, where the positive electrode of one cell forms the negative electrode of the next cell, can be used in redox flow batteries, and allow for the construction of high-voltage stacks with minimal inter-cell resistance. One feature of flow batteries is the ability to independently maximize the capacity or power capability of the system. The system capacity is dictated by ion concentration and electrolyte volume, while system power is controlled by electrode size and number of cell stacks. A stack can include a plurality of cells. In some embodiments, a stack can include about 1-200 cells. In some embodiments, a stack can include more than 200 cells.

Redox flow batteries are particularly suited for utility grid energy storage, in the 100 kW to 10 MW size range. Various applications for redox flow batteries can include, for example, load-leveling, peak shaving, spinning reserve, and wind farm stabilization and dispatch. Flow batteries can be used for backup power; 5 kW units are currently available for backup power applications in telecom, substation, and UPS applications. Wind farms can serve as "power sources" for flow batteries, which store energy while the wind is blowing, and can release the stored energy to the electrical grid during peak times.

Pumps suitable for use in embodiments of the present invention can include pumps capable of maintaining anolyte and catholyte flow at a rate of about 10 $mLmin^{-1}$ to about 80 $mLmin^{-1}$. In some embodiments, the pump may be, for example a Cole-Parmer Masterflex L/S Economy Drive Pump (Cole-Parmer, Vernon Hills, Ill.).

A reservoir suitable for use in embodiments of the present invention can be inert to the anolyte and catholyte solutions they contain. In some embodiments, the reservoir can include, for example, polyethylene, coated fiberglass, or polyvinyl chloride ("PVC"). In some embodiments, the reservoir may have a volume of about 0.05 L to about 1 L.

Applications for Redox Flow Batteries

Figure 4:
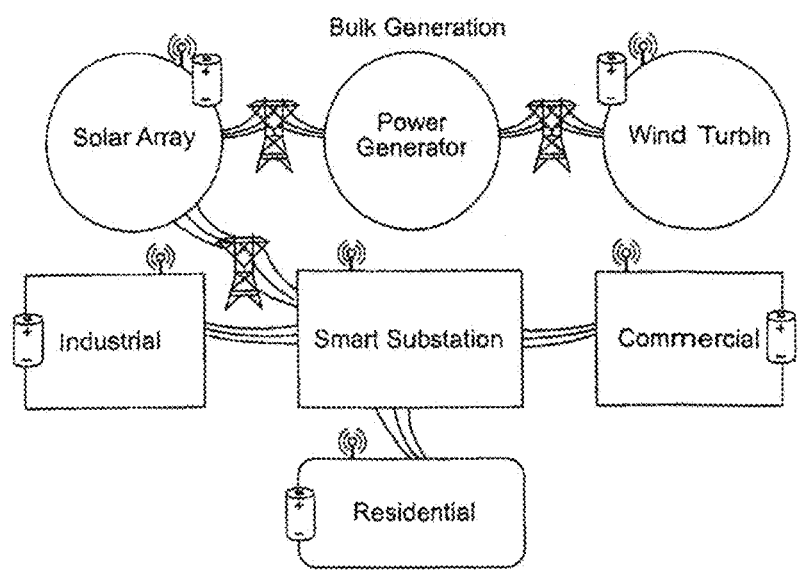
FIG. 4 shows a schematic representation of how flow batteries can be used in an EES system.

Because renewable energy sources such as solar and wind are intermittent, substantial penetration of such intermittent generation may place considerable stress on the U.S. electricity grid. Large-scale, efficient, electrical energy storage ("EES") systems can compensate for intermittent generation, and ensure that electricity is reliably available at all times. Embodiments of redox flow battery systems presented herein may fall into the category of EES systems and have uses in off-grid energy storage in, for example, load leveling, peak shaving, spinning reserve, uninterruptible power supply ("UPS"), wind farm stabilization, and dispatch. FIG. 4 shows a schematic diagram of how flow batteries can be used in an EES system. More specifically, electrical power generated by wind turbines, power generators and solar arrays is transmitted to a smart substation. When excess power is generated, it is stored in flow battery systems for industrial, commercial and residential use. In contrast, during other times when power is needed by users additional power is provided from the flow battery systems. Efficient building systems complete the EES system.

Embodiments of the presently-disclosed flow batteries can be used as backup power supplies for a variety of operations, including, for example, telecommunications, hospitals, and other large facilities that require uninterrupted power supplies. Some of these facilities are currently equipped with either solid oxide fuel cells ("SOFCs") or other forms of distributed energy, but also need EES systems to meet peak load demand, as well as loads that fall below the minimum practical turndown of the fuel cell. In addition, redox flow battery EES systems can act to maintain line voltage during step changes in load, thereby reducing any deleterious impact of load transients on SOFC system components, and on-board redox flow battery energy storage systems can allow for the controlled shutdown of powered systems and loads in the event of a SOFC system casualty.

EXAMPLES

The following Example is illustrative, but not limiting of the compositions and methods of the present disclosure. Other suitable modifications and adaptations of a variety of conditions and parameters normally encountered which are obvious to those skilled in the art are within the spirit and scope of this disclosure.

Example 1

Redox Flow Battery System Based on the Fe2+/Fe3+ Redox Couple at Both Electrodes 1. Preparation of iron anolyte: 1M K4Fe(CN)6 in 1M NaOH. Deionized water (200 mL) was added to a flask and stir bar, with vigorous stifling. Sodium hydroxide (8.0475 g) was added to the DI water, and allowed to dissolve. Potassium ferrocyanide trihydrate (84.478 g, 0.2 mol) was added slowly to the 1M NaOH solution, with stirring. After the iron salt completely dissolved, the solution was stored in a Nalgene bottle until further use.

2. Preparation of iron anolyte: 0.7M K4Fe(CN)6 in 1M NaOH. Deionized water (200 mL) was added to a flask and stir bar, with vigorous stifling. Sodium hydroxide (8.0475 g) was added to the DI water, and allowed to dissolve, to form a 1M solution of NaOH. Potassium ferrocyanide trihydrate (59.1376 g) was added slowly to the 1M NaOH solution, with stirring. After the iron salt completely dissolved, the solution was stored in a Nalgene bottle until further use.

3. Preparation of iron catholyte: 0.7M Fe3+ in 0.4M NaCl/3M NaOH. Deionized (DI) water (300 mL) was added to a flask and stir bar. Sodium chloride (7.01 g, 0.12 mol) was added to the DI water, followed by sodium hydroxide (36 g, 0.9 mol). The mixture was then stirred vigorously at room temperature, until complete dissolution of the sodium hydroxide pellets occurred. Triethanolamine (97.38 mL, 0.735 mol) was then added to the supporting electrolyte. Ferric sulfate (Fe2(SO4)3; 0.105 mol, 41.9895 g) was then added to the mixture, with vigorous stifling. The solution was heated to about 80° C. for several hours. The resulting solution is 0.35M in the iron salt, but is 0.7M in Fe3+, as two moles of iron are introduced for each mole of iron salt dissolved in solution.

Figure 5:
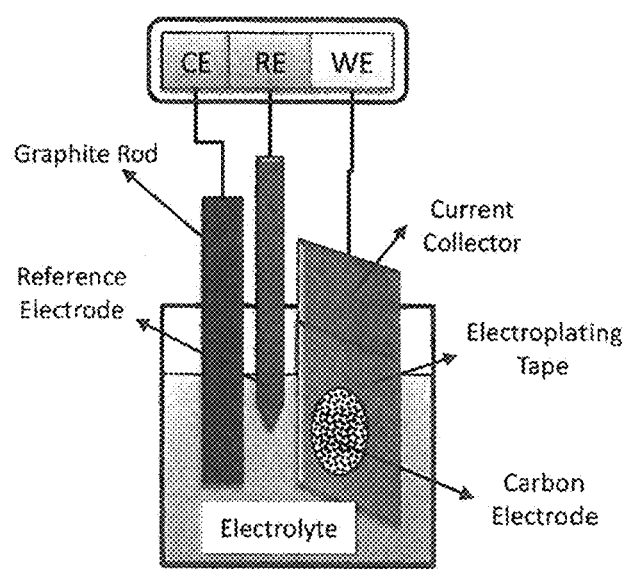
FIG. 5 is a schematic illustration of electrochemical half-cell testing.
Figure 6:
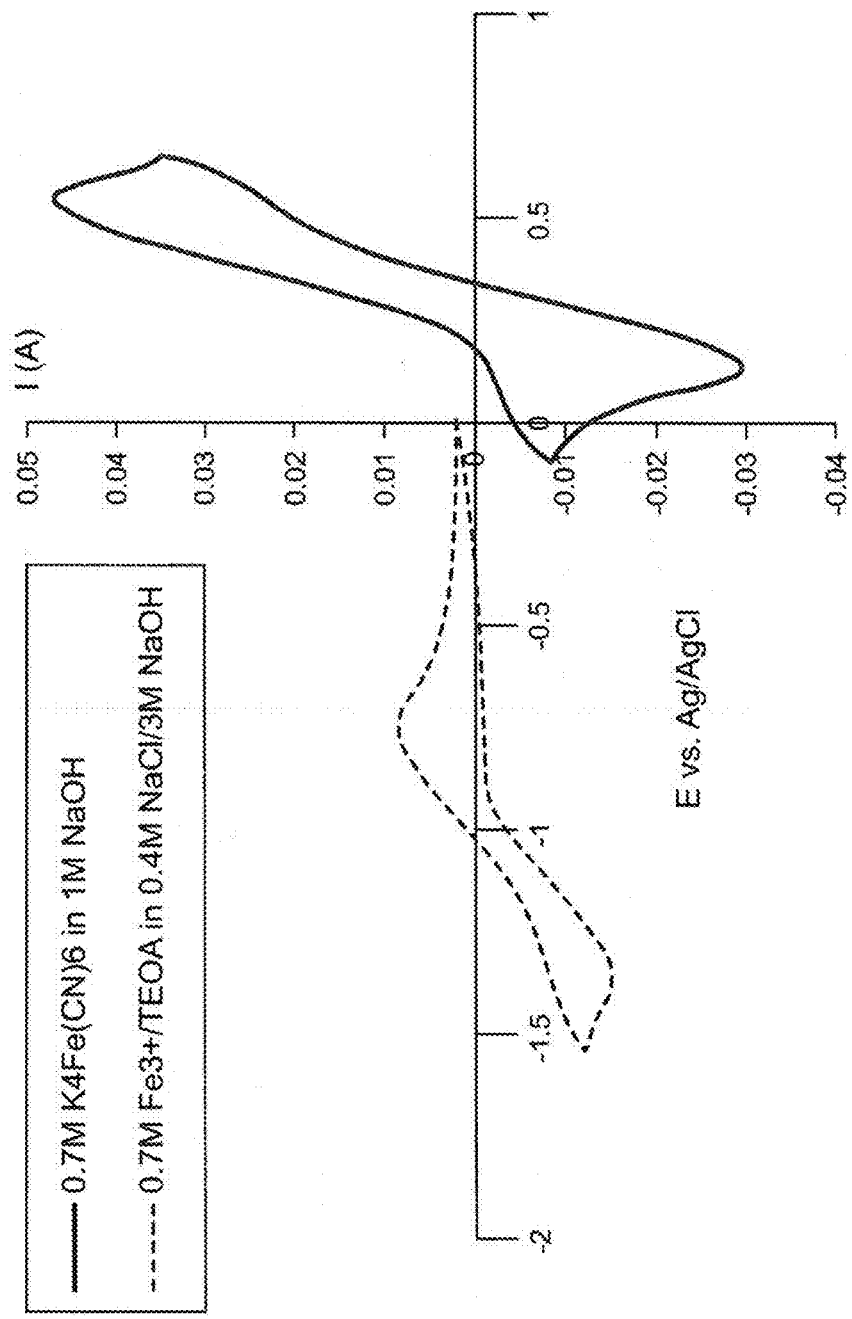
FIG. 6 shows cyclic voltammetry data for 0.7M iron anolyte and catholyte; sweeprate=0.02 V/s.

Cyclic voltammetry data of 0.7M iron anolytes and catholytes. The electrolytes were tested for electrochemical activity in separate three-electrode cells, using a graphite disk working electrode (diameter=2.54 cm), a graphite rod counter electrode, and a Ag/AgCl reference electrode (schematic shown in FIG. 5). Cycling was performed in an unstirred, quiescent solution (total electrolyte volume=150 mL). A nitrogen purge was used while catholyte testing occurred. The cyclic voltammogram for the electrolytes, at positive potentials, and at a sweep rate of 0.02 V/s, is shown in FIG. 6.

4. Preparation of iron catholyte: 0.5M Fe3+ in 3M NaOH; no NaCl added. Deionized (DI) water (300 mL) was added to a flask and stir bar. Sodium hydroxide (36.0119 g, 0.9 mol) was added to the deionized water, with stirring. Triethanolamine (69.55 mL, 0.525 mol) was then added to the NaOH solution. Ferric sulfate (Fe2(SO4)3; 0.075 mol, 29.9285 g) was then added to the mixture, and the mixture was stirred until dissolution of the iron salt occurred. The resulting solution is 0.25M in the iron salt, but is 0.5M in Fe3+, as two moles of iron are introduced for each mole of iron salt dissolved in solution.

5. Preparation of iron catholyte: 0.5M Fe3+ in 04M NaCl/3M NaOH; NaCl added; standard catholyte formulation. Deionized (DI) water (300 mL) was added to a flask and stir bar. Sodium chloride (7.01196 g, 0.12 mol) was added to the deionized water, with stifling, followed by sodium hydroxide (36. g, 0.9 mol). Triethanolamine (69.55 mL, 0.525 mol) was then added to the NaOH solution. Ferric sulfate (Fe2(SO4)3; 0.075 mol, 30.0007 g) was then added to the mixture, and the mixture was stirred until dissolution of the iron salt occurred. The resulting solution is 0.25M in the iron salt, but is 0.5M in Fe3+, as two moles of iron are introduced for each mole of iron salt dissolved in solution.

Figure 7:
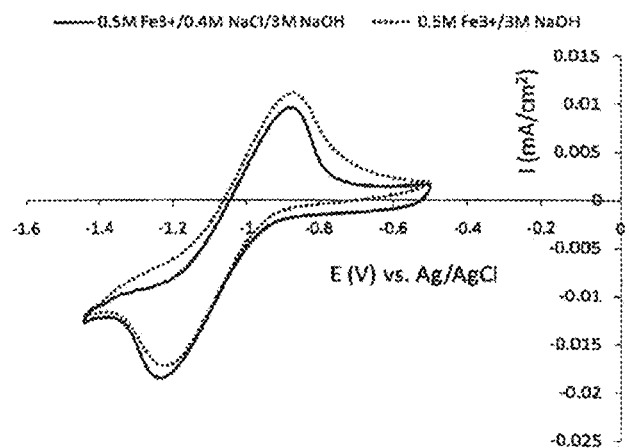
FIG. 7 shows cyclic voltammetry data for 0.5M $Fe^{3+}$/triethanolamine complex in 3M NaOH, with and without 0.4M NaCl.

Cyclic voltammetry data. The cyclic voltammograms for 0.5M iron catholytes, with and without 0.4M NaCl, are seen in FIG. 7. Table 1 is a summary of the reversible potentials and peak separations for the two electrolytes.

TABLE 1

Summary of electrochemical performance for 0.5M iron catholytes, with and without 0.4M NaCl.

| sample | $E_{ox.}$ (V) | $E_{red.}$ (V) | $E_{rev.}$ (V) | Peak sep. (V) | $I_a$ (A) | $I_c$ (A) | $I_a/I_c$ |
|---|---|---|---|---|---|---|---|
| 0.4M NaCl | −0.878 | −1.23 | −1.06 | 0.356 | 0.049 | 0.094 | 0.521 |
| No NaCl | −0.869 | −1.22 | −1.05 | 0.353 | 0.057 | 0.088 | 0.648 |

6. Preparation of iron anolyte: 0.5M K3Fe(CN)6 in 2M KCl; "neutral" anolyte. Deionized water (500 mL) was added to a flask and stir bar. Potassium chloride (74.542 g, 1 mol), was added to the deionized water, with stirring. Potassium ferricyanide (K3Fe(CN)6) (82.3248 g, 0.25 mol) was then added to the mixture, which was stirred until dissolution of the iron salt occurred. The solution was then stored in a Nalgene bottle until further use.

Figure 8:
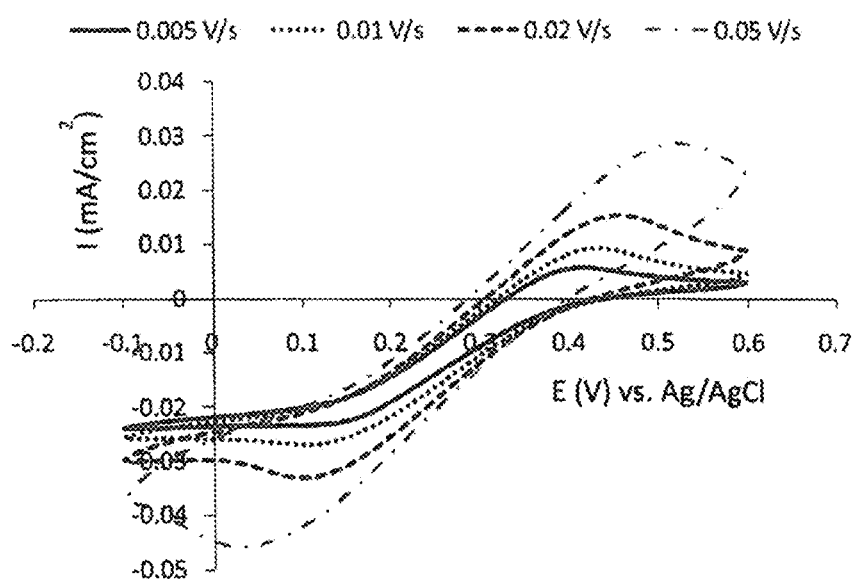
FIG. 8 shows cyclic voltammograms of 0.5M $K_3Fe(CN)_6$ in 2M KCl.

Cyclic voltammetry data. The electrochemical performance of the 0.5M Fe anolyte in 2M KCl, measured at various sweep rates, is shown in FIG. 8.

7. Electrode preparation/cell assembly. To demonstrate the efficacy of the Fe/Fe redox flow battery chemistry, small pseudo-button cells were assembled, using the following procedure.

Electrode preparation: Graphitized carbon nanotube electrodes, or graphite particulate, were assembled by mixing with 5% PTFE binder (m/m). The mixture was heated in the oven, under vacuum, to 130° C. The electrode mixture, or "dough", was then removed from the oven, and the electrode dough was worked with a mortar and pestle until mechanical binding of the mixture occurred. The electrode dough was then rolled out to a flat sheet of ~200 microns in thickness. Disks of 10 mm diameter were then punched out of the electrode sheet, and the disks were rolled out to a thickness of 70-90 microns in diameter, and were punched out to a final 12 mm diameter. The electrodes were then stored in the vacuum oven until cell assembly.

Membrane preparation: The ion exchange membrane was Nafion 117, from DuPont. The procedure for membrane preparation began with soaking the membrane in 3% H2O2 for 60 minutes at 80° C., followed by rinsing with DI water. The membrane was then soaked in deionized water for 30 minutes at 80° C., followed by a soak in 1M H2SO4 for 30 minutes at 80° C.; with a final soak in 1M NaOH, to convert the membrane to the Na+ form.

Cell construction: The current collectors used in the pseudo-button cells were carbon-loaded polymer current collectors from Exopack Advanced Coatings (2252P), and the thermoplastic gasket material was purchased from JME, Inc. Current collectors of 24 mm diameter were punched out, followed by the thermoplastic gasket material (24 mm outer diameter, 14 mm inner diameter). The gasket material was placed on top of the carbon-loaded polymer current collector, and was physically attached to the current collector through the use of a specially designed "heat-sealer", which is essentially a hydraulic piston which presses down onto the current collector, while providing a "pulse" of current to heat a metal ring underneath the current collector, thus compressing and sealing the gasket material to the current collector. The Teflon-bonded electrodes were then placed into the shallow wells on the positive and negative current collectors, and were flattened out by using a pair of tweezers. Iron anolyte (0.4M K4Fe(CN)6*3H2O in 1M NaOH) was then added to the surface of the "positive" carbon nanotube electrode, while iron catholyte (0.4M Fe3+/TEOA complex in 0.4M NaCl/3M NaOH) was added to the surface of the "negative" carbon nanotube electrode. The electrolytes were allowed to soak into the composite electrodes, before more electrolyte was added. The membrane (Nafion 117, Na+ form, 22 mm diameter) was then placed onto the "negative" electrode and current collector, and was sealed by using the heat sealer. Cell construction was completed by placing the positive and negative electrodes together, and sealing the entire cell. The assembled cell was then placed between 2 conductive endplates, using a C-clamp to apply pressure to the entire cell. The assembled cell was then placed onto a Solartron 1286 potentiostat/galvanostat supported by Corrware software, for electrochemical screening.

Figure 9:
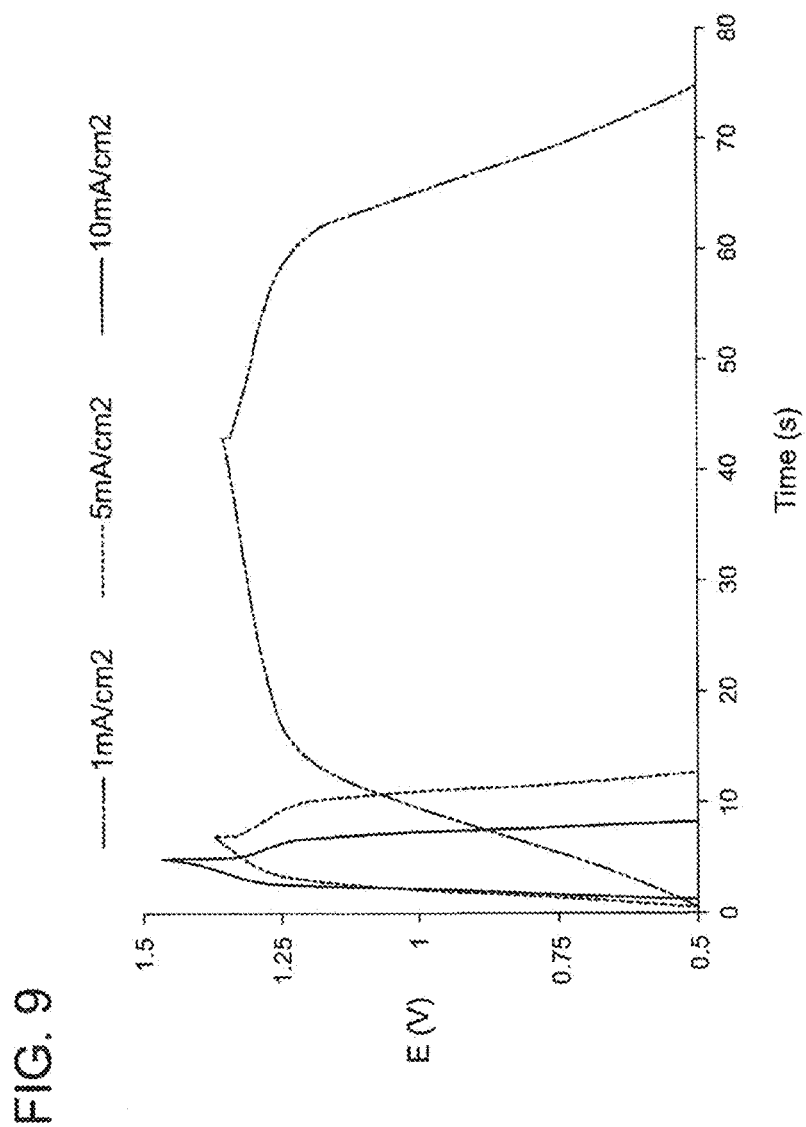
FIG. 9 shows charge/discharge data for the all—Fe electrolyte system at different current densities.
Figure 10:
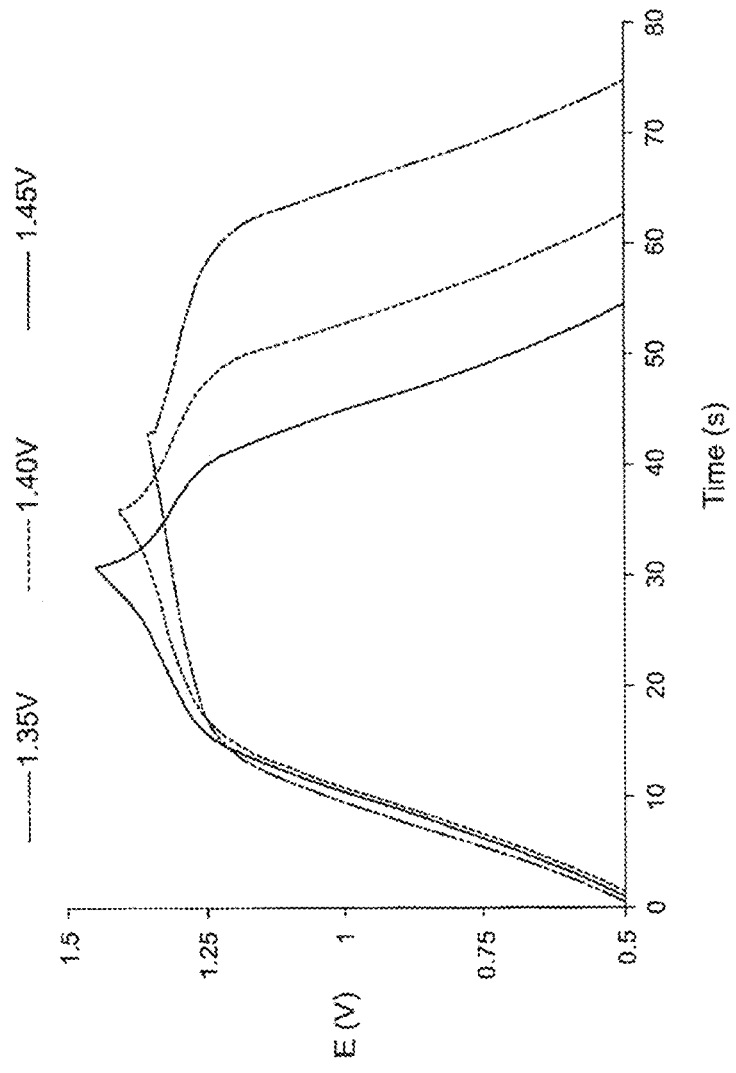
FIG. 10 shows charge/discharge data for the all—Fe electrolyte system at different cutoff voltages.

The assembled electrochemical cell was programmed to run constant current charge/discharge experiments, at various current densities. The apparent current densities were normalized to the apparent geometric surface area of the graphitized carbon nanotube electrodes defined by the cell fixture. The cell was initially charged to a maximum voltage of 1.35 V, and then discharged to 0.5 V. The cell was cycled in this manner at the three different current densities (1, 5, and 10 mA/cm2). The pseudo-button cell was then charged to three different maximum charge voltages (1.35, 1.40, and 1.45 V) at a current density of 1 mA/cm2. FIG. 7 shows charge/discharge curves for the cell at three different current densities, 1, 5, and 10 mA/cm2. FIG. 8 shows charge/discharge curves recorded for three different charge cutoff voltages, 1.35, 1.40, and 1.45 V, at 1 mA/cm2. FIGS. 9 and 10 demonstrate the feasibility of developing an all-iron redox flow battery system, using the redox chemistries as described above.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An electrolyte system for a flow battery, comprising:
   an anolyte comprising sodium hydroxide, $[Fe(CN)_6]^{3-}$ and $[Fe(CN)_6]^{4-}$; and
   a catholyte comprising sodium hydroxide, triethanolamine, $Fe^{2+}$ and $Fe^{3+}$,
   whereby a fuel is suppliable to the anolyte and/or the catholyte for recharging the flow battery.

2. The electrolyte system of claim 1 wherein said anolyte includes a first supporting electrolyte.

3. The electrolyte system of claim 2, wherein said first supporting electrolyte is selected from a group of ions consisting of $Cl^-$, $OH^-$, $CO_3^{2-}$ and mixtures thereof.

4. The electrolyte system of claim 1, wherein said $Fe^{2+}$ has a concentration of at least about 0.7M.

5. The electrolyte system of claim 1, wherein said $Fe^{2+}$ has a concentration of at least about 0.6M.

6. The electrolyte system of claim 1, wherein said $Fe^{2+}$ has a concentration of at least about 0.5 M.

7. The electrolyte system of claim 1, wherein said $Fe^{2+}$ has a concentration of at least about 0.4M.

8. The electrolyte system of claim 1, wherein said anolyte has a sodium hydroxide concentration of between about 1.0M to 3.0M.

9. The electrolyte system of claim 1, wherein said catholyte includes an iron/ligand complex.

10. The electrolyte system of claim 9, wherein said ligand of said iron/ligand complex is selected from a group consisting of triethanolamine, diethanolamine, ethanolamine, N,N-bis-(2-hydroxyethyl)-(iminotris)-(hydroxymethyl)-methane and mixtures thereof.

11. The electrolyte system of claim 10, wherein said catholyte has a ligand-to-iron ratio of about 3:1 to about 10:1.

12. The electrolyte system of claim 10, wherein said catholyte has an $Fe^{3+}$ concentration of at least about 0.7M.

13. The electrolyte system of claim 10, wherein said catholyte has an $Fe^{3+}$ concentration of at least about 0.6M.

14. The electrolyte system of claim 10, wherein said catholyte has an $Fe^{3+}$ concentration of at least about 0.5M.

15. The electrolyte system of claim 10, wherein said catholyte includes a second supporting electrolyte.

16. The electrolyte system of claim 15, wherein said second supporting electrolyte is selected from a group of ions consisting of $Cl^-$, $OH^-$ and mixtures thereof.

17. The electrolyte system of claim 15, wherein said second supporting electrolyte consisting only of $OH^-$.

18. The electrolyte system of claim 1, wherein said anolyte has a pH greater than pH7.

19. The electrolyte system of claim 1, wherein said catholyte has a pH greater than pH7.

20. The electrolyte system of claim 1, wherein said catholyte has a pH of between 5 and 7.

21. The electrolyte system of claim 1, wherein said anolyte has a sodium chloride concentration greater than about 0.4M.

22. A redox flow battery using an anolyte comprising sodium hydroxide, $[Fe(CN)_6]^{3-}$ and $[Fe(CN)_6]^{4-}$ and a catholyte comprising sodium hydroxide, triethanolamine, $Fe^{2+}$ and $Fe^{3+}$, wherein the battery contains a plurality of cells, each of the plurality of cells being separated from an adjacent cell by a bipolar plate electrode.

* * * * *